United States Patent [19]
Nichols

[11] Patent Number: 6,035,254
[45] Date of Patent: Mar. 7, 2000

[54] GPS-AIDED AUTOLOCK IN A ROBOTIC TOTAL STATION SYSTEM

[75] Inventor: Mark E. Nichols, Sunnyvale, Calif.

[73] Assignee: Trimble Navigation Limited, Sunnyvale, Calif.

[21] Appl. No.: 08/949,983

[22] Filed: Oct. 14, 1997

[51] Int. Cl.[7] ........................................ G01S 5/02
[52] U.S. Cl. ................ 701/213; 701/207; 701/300; 342/357
[58] Field of Search ................... 701/226, 300, 701/207, 213; 342/357; 348/169

[56] References Cited

U.S. PATENT DOCUMENTS

| | | | |
|---|---|---|---|
| 5,001,650 | 3/1991 | Francis et al. | 348/169 |
| 5,644,318 | 7/1997 | Janky et al. | 342/357 |

*Primary Examiner*—William A. Cuchlinski, Jr.
*Assistant Examiner*—Arthur Donnelly
*Attorney, Agent, or Firm*—Blakely, Sokoloff, Taylor & Zafman LLP

[57] ABSTRACT

A surveying system for accurate determination of the position of a target based on ranging information provided by a positioning system is disclosed. A target is configured with a receiver to receive positioning signals from a positioning system, such as the Global Positioning System (GPS). The target transmits to a total station system position information estimating the target's location. The total station system, based on the location and orientation of the total station and the estimated location of the target, determines the angular displacement which is used to control a servo mechanism to align the total station unit with the target. Finer adjustments can thereafter be performed to more accurately align the total station to the target.

27 Claims, 5 Drawing Sheets

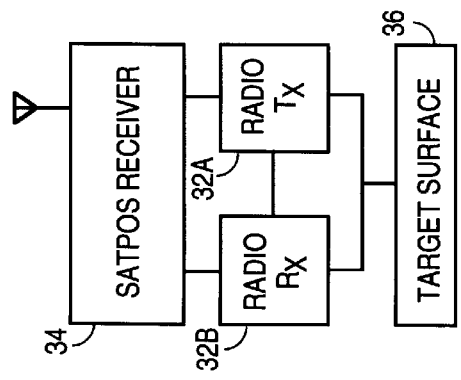
FIG. 2B
FIG. 2D
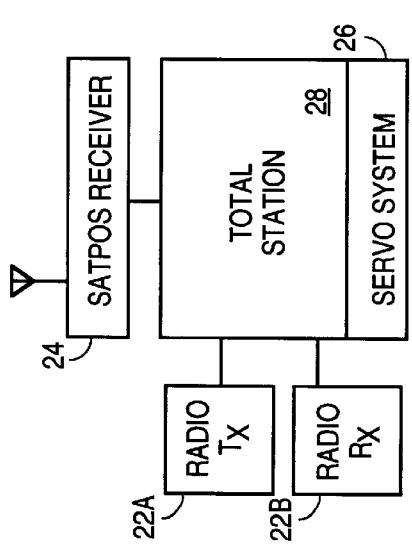
FIG. 2A
FIG. 2C

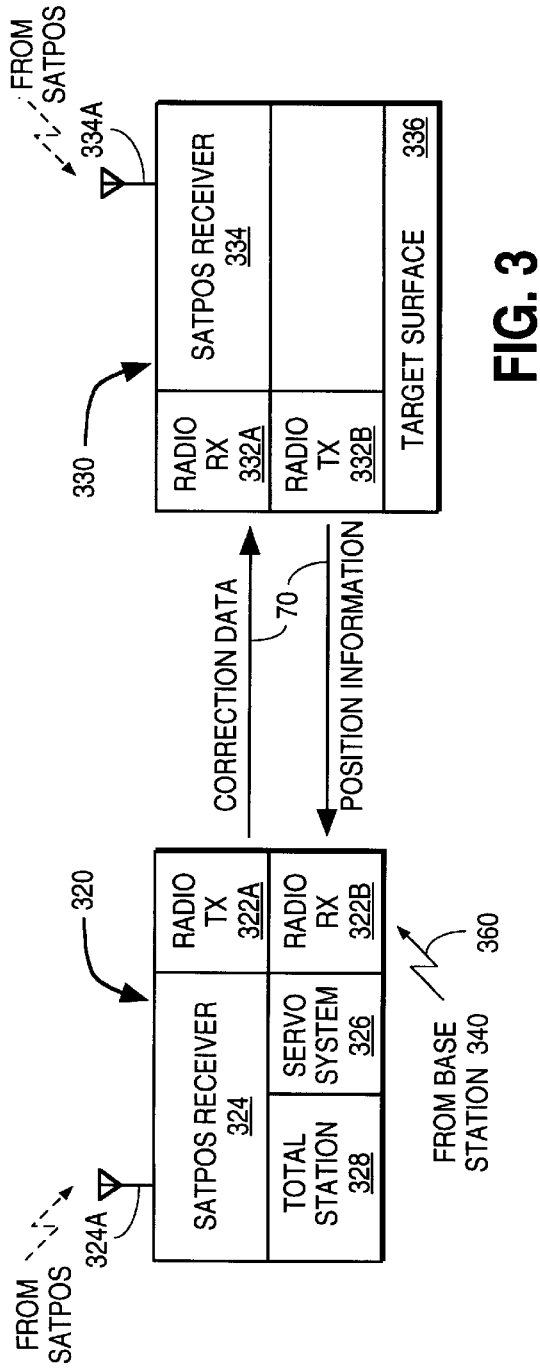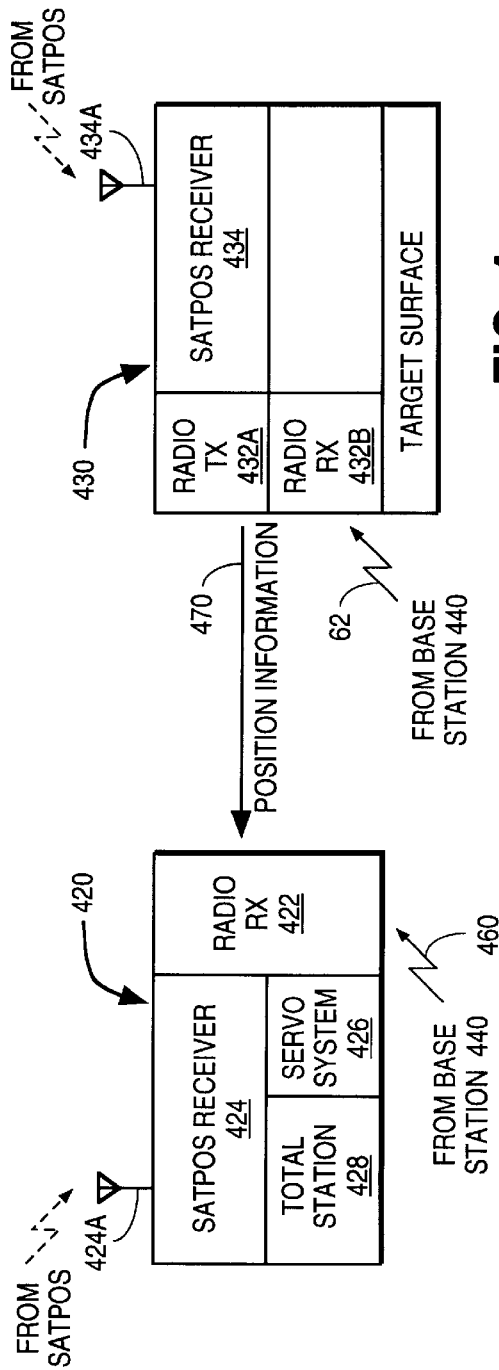

GPS-AIDED AUTOLOCK IN A ROBOTIC TOTAL STATION SYSTEM

BACKGROUND OF THE INVENTION

1. Field of the Invention

The present invention relates in general to survey devices and in particular, to an apparatus and method for automatic locking ("autolocking") a total station to a target.

2. Prior Art

The art of surveying involves the determination of an unknown position from angular and distance measurements taken from one or more reference positions. A surveying device frequently used to measure distance and angles to a target is a total station. In operation, the user points the total station at a target held by a second user. Typically, the pointing process is achieved optically (e.g., by the user visually locating the target through a view finder type of apparatus). Robotic total stations have been developed to assist in locating the target. The robotic total stations include servo motors that allow the apparatus to be rotated so as to align its measuring units towards a reflective target. Once aligned, the reflective target may be used for measuring the angle to, and the distance from the surveying system. Examples of such robotic surveying systems include the Geodimeter System 600 manufactured by Geotronics AB of Sweden, and the TPS-System 1000 total station manufactured by Leica of Switzerland.

A robotic total station eliminates the need to have a user at the location of the total station. Instead, the user is at the target. With one system the user sights the total station visually through a view finder apparatus located on the target. Upon visually locating the total station, the user initiates an angular scanning search sequence at the total station so the total station can find and lock onto the target for more precise angular and distance measurements.

During the set-up of some robotic total stations, the user is prompted to provide the limits of a scanning window or search zone by specifying the elevational and azimuthal limits of the search. This is accomplished, for example, by marking the highest point of the scanning zone on the left hand corner of the viewfinder, and the lowest point of the scanning zone on the right hand corner of the viewfinder. The two specified points enable the robotic surveying system to set up the window within which the scanning sequence is performed. Once the scanning is set, the user can place the target at the location to be measured, sight the total station and remotely initiate an angular scanning sequence which the system is programmed to perform to precisely locate the target. During the scanning sequence, the total station transmits a signal. Reflection of the signal by the target will only occur when the total station is substantially aligned with the target. The reflected signal received by the total station is used in calculating the location of the target. More particularly, the stronger the received reflected signal, the more likely the total station is focused centrally on the target.

One problem with such conventional robotic total stations is that the target must first be identified or generally observed by the total station before the location station can locate the target. In addition, the angular scanning angles of the total station are limited so that the user may have to adjust the total station and reinitiate the process with the target. This is a very cumbersome task, especially if the total station is not within close physical proximity of the user, since the total station has to be manually reset. Furthermore, if the target is obstructed by the terrain or by buildings, the radio link provided by such conventional robotic total stations will also be obstructed, and attempts for locating the target will be unsuccessful. Moreover, since the target has to be visually located, and the signal from the surveying system must be reflected off the target, it is difficult to locate and to lock onto targets over long ranges.

Accordingly, there is a need in the technology for a method and apparatus for providing a search routine which facilitates accurate, robust and efficient location of a target using a robotic total station.

BRIEF SUMMARY OF THE INVENTION

A surveying system for accurate determination of the position of a target based on range and angle measurements is disclosed. In one embodiment, the system includes a target device to be positioned at the location to be measured and a total station, such as a robotic total station, which performs measurements with respect to the target. The target includes a receiver for receiving from a positioning system, such as the Global Positioning System, position information regarding the location of the target. The total station is coupled to a first receiver that receives from the positioning system, position information regarding the total station's location and a second receiver that receives from the target, position information regarding the target's location. A servo system also is coupled to the first receiver, the second receiver and the total station. The servo system aligns the measurement unit with the target based on the total station's location and orientation and the position information regarding the target's location.

BRIEF DESCRIPTION OF THE DRAWINGS

FIGS. 2a, 2b, 2c and 2d, respectively, generally illustrate embodiments of a total station and the target.

FIG. 3 illustrates one embodiment of a robotic total station and the target.

FIG. 4 illustrates an alternate embodiment of a robotic total station and the target.

DETAILED DESCRIPTION OF THE INVENTION

Figure 1:
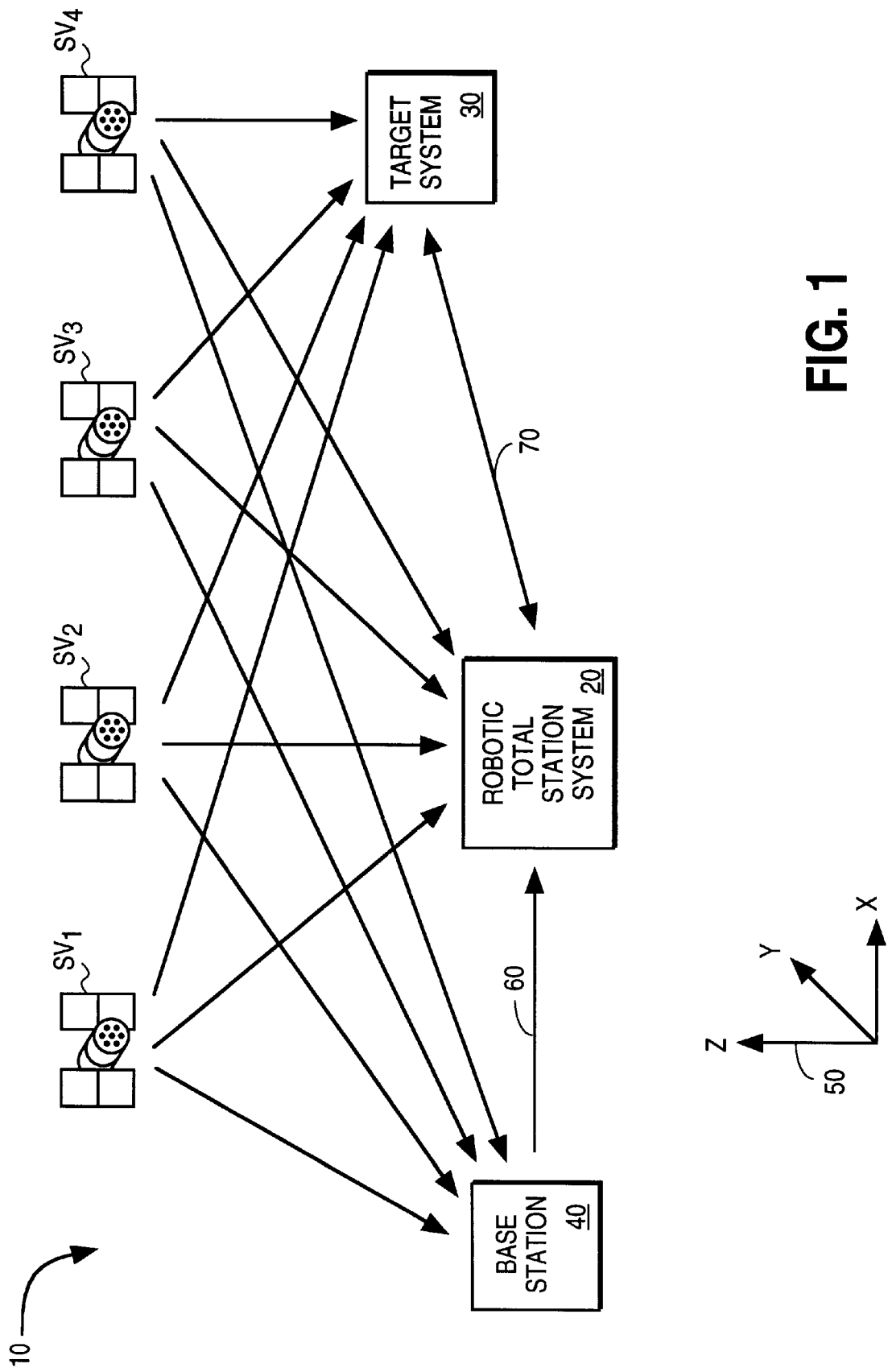
FIG. 1 illustrates a radiolocation system 10 of the present invention.

FIG. 1 illustrates one embodiment of a radiolocation system 10 which implements the robotic total station system 20 of the present invention. A total station is a surveying apparatus, typically mounted on a tripod, used to measure distances and angles to targets. A robotic total station includes a servo mechanism and associated control logic to rotate the total station to point to the target. Some total stations and robotic total stations 20 are coupled to receivers that receive positioning signals that enable the total station to determine its position. Such positioning signals are provided by a positioning system, for example, by a plurality of satellites $SV_i$ (where i=1, ..., N) in a Satellite Positioning System (SATPOS). In the present embodiment, reference to a positioning system, Satellite Positioning System or SATPOS herein refers to a Global Positioning System (GPS), to a Global Orbiting Navigation Satellite System (GLONASS), and to any other positioning system, including pseudolites, that provides information by which an observer's position can be determined. The SATPOS may also provide information by which an observer's velocity and/or the time of observation can be determined.

In the embodiments described below, the robotic total system includes a total station, servo system to move the total station, a satellite positioning system (SATPOS) receiver, a radio receiver and a radio transmitter. The target system includes a target surface, SATPOS receiver, radio receiver and a radio transmitter. It is contemplated that the elements may or may not reside in a common housing. This is illustrated by FIGS. 2a, 2b, 2c, 2d.

FIG. 2a illustrates a total station system in which the SATPOS receiver 24 and radio receiver 22b and transmitter 22a circuitry are coupled to the housing which includes the total station 28 and the servo system 26 used to control the movement of the total station 28. Similarly, FIG. 2b illustrates a target in which the target surface 36, radio receiver 32b, radio transmitter 32a and SATPOS receiver 34 are separately coupled together. It is apparent that two or more of the components can be integrated together in a variety of configurations, including integration in a single housing as shown in FIGS. 2c and 2d.

For purposes of explanation and illustration, the subsequent embodiments described are illustrated as integrated into a single housing. However, it is contemplated that the functionality described therein can be embodied a variety of ways.

In one embodiment of the robotic total station system of the present invention, the system 20 includes a receiver that receives from the target 30, what is referred to herein as position information e.g., vector, range and angular information or coordinates, from which the apparatus can determine the position of the target, and therefore determine where the total station should be pointed to, based upon the received position information from the target 30, by the position of the robotic total station 20 and orientation of the robotic total station 20. The servo system in the robotic total station 20 is then controlled to move the measurement device to point to that location where the target is located. The servo system typically includes servo motors to rotate the total station and control circuitry to control the movements performed by the servo motors. Finer adjustment of the total station can then be performed using known scanning algorithms used to control the servo motors. As will be discussed below, the position of the target 30 can be calculated using satellite positioning data such as GPS data. Although not required to practice the present invention, increased accuracy in determining the target 30 position can be achieved using differential correction (DGPS) or real time kinematic (RTK) procedures, resulting in smaller scan widths and faster scans. In a system that uses DGPS, for example, base station 40 sends correction data to the robotic total station system which uses the correction data to improve the accuracy of the measurements.

In one embodiment, position information obtained by the target system 30 from the SATPOS (which includes position and ranging information), are transmitted to the robotic total station system 20. Correction data is received from base station 40. Based on the position information and on the correction data provided by the base station 40, control logic within the robotic total station 20 determines displacement of the target relative to the total station. Servo system control logic controls the servo motors to move the total station to the point to the estimated target position. It is contemplated that the control logic used to perform the necessary calculations is integrated into the servo system control logic or alternately, separate logic is utilized.

Surveying applications and measurements typically are performed within a coordinate frame of reference, such as the World Geodetic System 1984 (WGS 84) or North American Datum 1983 (NAD 83), or x, y, z. Known locations, such as prior surveyed locations or measurements, are used to determine the orientation of the total station. Typically, the orientation of the total station is determined by the total station observing two points, the locations of which are known within the frame of reference. For example, the first known location may be the location of the total station system 20 and the second a monument 50 located in the vicinity of the total station. Using the coordinates of the two locations, the orientation of the total station with respect to the frame of reference is determined. The calculations performed correspond to well known surveying calculations performed to determine the location of a target given the known location and bearing of the measurement device and the latitude and departure of the target from the measurement device. See e.g., Charles A. Herubin, *Principles of Surveying*, (Prentice Hall, 1991) pp. 8–15, and Francis H. Moffitt, Harry Bouchard, *Surveying, 9th Edition*, (Harper Collins Publishers, Inc. 1992) pp. 168–169 and 282–296.

As noted above, based on the estimated position of the target, the servo system 26 aligns the total station with the target system 30. The position of the total station is further adjusted as necessary in order that the total station is pointed towards the target surface. Preferably, scanning algorithms found in current robotic survey devices are used. For example, the robotic total station scans within a preset window for the maximum returned signal strength. Typically the total station issues a signal which is reflected off the target surface. The more accurately aligned the total station is to the target, the stronger the return signal received. The amount of movement of the total station as controlled by the servo system can be calculated using the estimated location of the target and the orientation and location of the total station. The size of the search window can be defined based on the accuracy of the approximation of the location of the target.

In another embodiment, a base station 40 forwards correction data via a communication link 60 to the robotic total station system 20. The robotic total station system 20 then forwards the correction data to a target system 30 via a second communication link 70, which enables the target system 30 to compute its position using a combination of the positioning signals from the satellites and the correction data from the robotic total station system 20. The position of the target is then transmitted back to the robotic total station system 20 via communication link 70.

In a third embodiment, the corrected measurements obtained directly from the base station 40 are received at the target via a DGPS receiver and are used to produce an improved estimate of the target system's 30 position and/or velocity. This estimate is transmitted back to the robotic total station system 20, which then more accurately locates the target 30, particularly if the target is moving and the servo must lock on and track the position of the target by taking multiple accurate measurements.

FIG. 3 illustrates one embodiment of the robotic total station system 320 and target system 330 in accordance with the teachings of the present invention. As shown in FIG. 3, the respective locations of the robotic total station system 320 and the target system 330 are first determined using signals obtained from the SATPOS satellites $SV_i$. Correction data provided by the base station 340 to the robotic total station 320 via a communication link 360 and radio receiver 322b is then forwarded to the target system 330 via radio transmitter 332a (or may be received directly by target 330 from the communication link 360) and communication link 370. Based on the correction data and the position information provided by the SATPOS satellites $SV_i$, received via antenna 334a and processed by receiver 334, the target system 330 calculates its estimated position. The estimated target information is then transmitted back to the total station system 320 via radio transmitter 332a and the communication link 370. Based on the estimated target position received, the servo system 326 automatically aligns total station 328 towards the target surface 336, and optionally a scanning process is then performed to more accurately point the total station 328 to the target surface 336.

The communication link 370 can be implemented using a variety of different embodiments in order to transmit the correction data from the total station system 320 to the target 330 and for communicating the position information from the target 330 to the total station system 320. Similarly, the communication link 350 may be implemented using various embodiments for transmitting the correction data from the base station 340 to the total station 320. In general, the communication link(s) 360 and/or 370 can employ a radio-wave frequency band, an infrared frequency band, or a microwave frequency band.

FIG. 4 illustrates an alternate embodiment of the robotic total station system 420 and the target system 430. In this embodiment, the target 430 receives the correction data directly from the base station 440 via communication link 462, and uses the correction data to adjust the pseudo range measurements that the target 430 obtains from the received satellite signal. The communication link 462 may be implemented in the same manner as the communication link 460. The target system 430 then uses the correction data to produce an estimate of the target system's 430 position and/or velocity. The target system 430 then transmits this estimate to the robotic total station system 420 via a communication link 470. Although not limited as such, in this embodiment, the link may be unidirectional. Based on the position information received, the servo system 426 automatically aligns the total station 428 towards the target 430.

Figure 5:
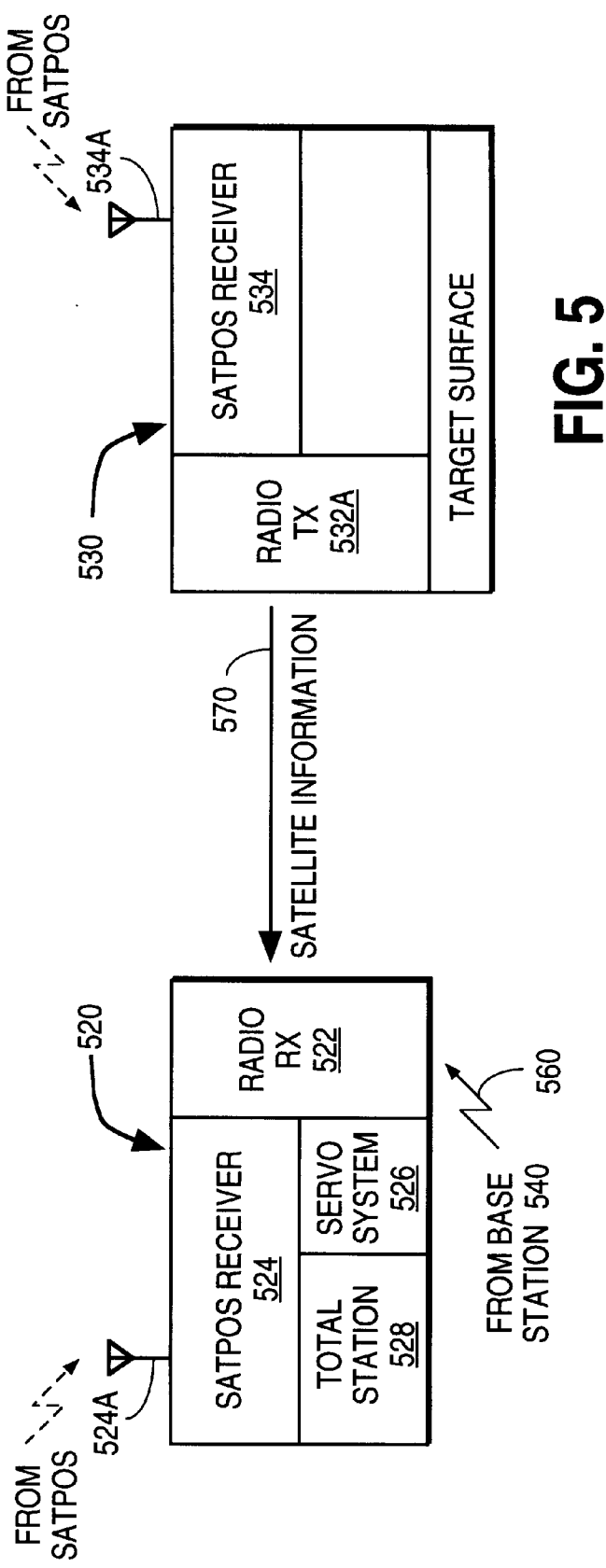
FIG. 5 illustrates a third embodiment of a robotic total station and the target.

FIG. 5 illustrates a third embodiment of the robotic total station system. In this embodiment, the robotic total station system 520 receives the correction data from the base station 540 via communication link 560, and uses the correction data to adjust the pseudo range measurements that the target system 530 obtains from the received satellite signal. The servo system 526 automatically aligns the total station 528 towards the target 230 based upon the adjusted measurement.

It is apparent to one of ordinary skill that the target system described in the above embodiments may be stationary or mobile. If the target system is stationary, the apparatus and method of the present invention may be implemented to provide the terrestrial position of the target system. If the target system is mobile, the apparatus and method of the present invention may also be implemented to provide the timing coordinates and the velocity of the target system.

Figure 6:
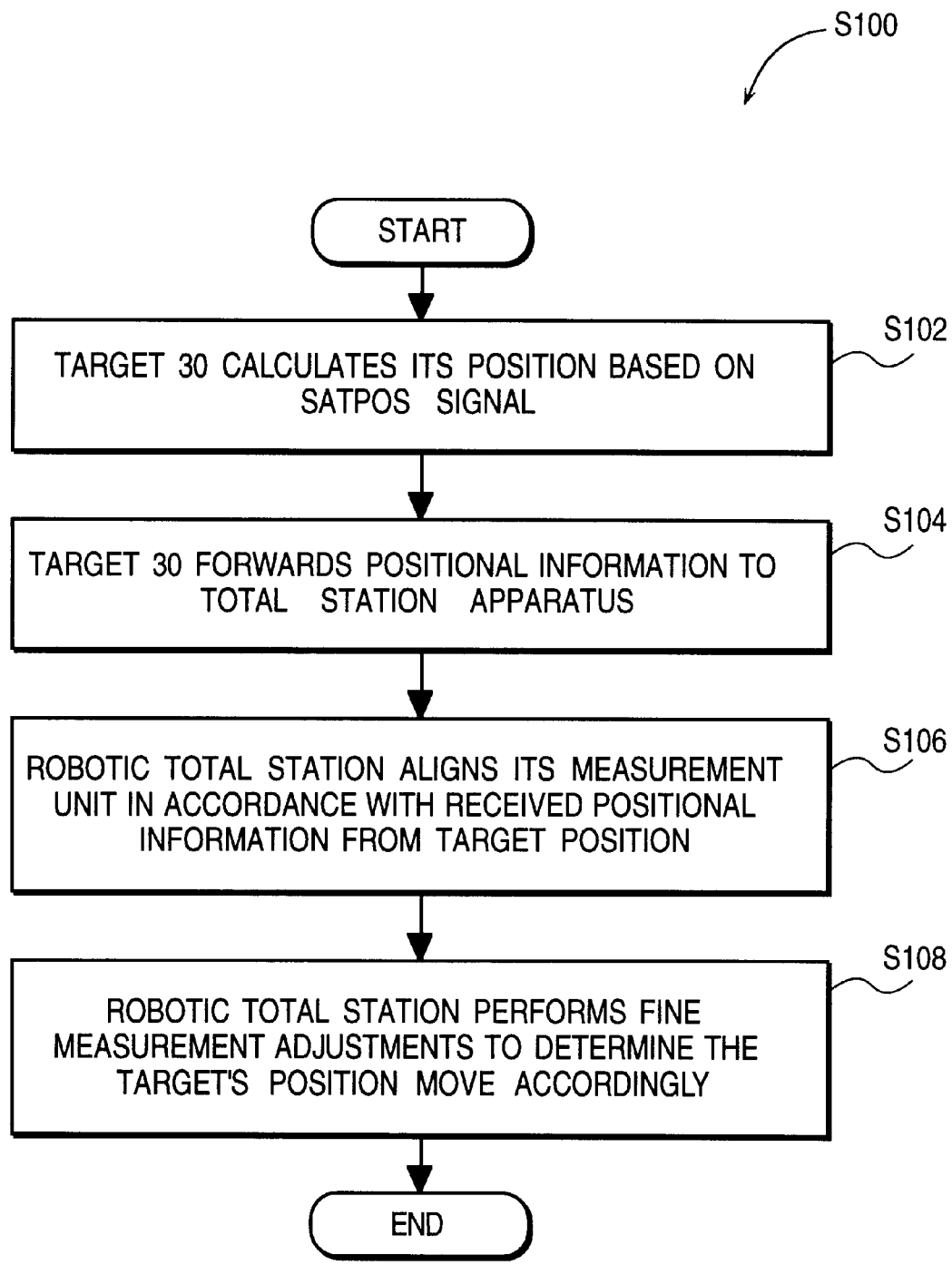
FIG. 6 is a flow chart illustrating one embodiment of the radiolocation process in accordance with the teachings of present invention.

FIG. 6 is a flow chart which illustrates one embodiment of the radiolocation process S100 in accordance with the teachings of the present invention. Beginning from a start state, the process S100 proceeds to process step S102, where the target system calculates its position based on the position information obtained from the SATPOS satellites $SV_i$. At process step S104, the target system transmits the calculated position information to the robotic total station system. The servo system in the robotic total station then aligns the total station to the estimated target position in accordance with the received target position information (process step S106).

At step 108, the robotic total station system 120 performs a routine to more precisely align the total station to the target, such as prior art scanning processes for scanning a window about the estimated target position based upon the maximum received return signal strength.

Different portions of the process S100 of the present invention may be implemented in existing robotic total station systems and/or target systems by installing appropriate software routines or hardware logic suitable for calculating the positional information of the target system as described above. Appropriate software routines may also be installed on the target system for performing calculations of its position based on the satellite $SV_i$ positional data and the correction data forwarded by the robotic total station system or the base station.

Through implementation of the principles of the present invention, the user of a robotic total station system need not manually perform a process to position the total station towards the target before finer measurement adjustments can be determined. As a result, both the time and effort for obtaining coarse position information are saved. The implementation of the present invention also provides very high reliability of position information, and accuracies of up to 2 centimeters (cm) are possible, using, for example, RTK processes. Furthermore, since a SATPOS system and radio communication links are utilized for communicating position information, the target does not have to be in the line of sight of the total station for the servo system to track the target and the target can be located nearly instantly by the total station when it became unobstructed by terrain or buildings. Finally, the present invention provides the ability to search, identify and to lock onto targets over long ranges.

The description of the preferred embodiment of this invention is given for the purposes of explaining the principles thereof, and is not to be considered as limiting or restricting the invention since many modifications may be made by the exercise of skill in the art without departing from the scope of the invention.

What is claimed is:

1. A total station system positioned at a determined location and orientation in a first reference system, said total station system comprising:

a first receiver configured to receive from a target, target position information comprising the target's estimated location;

a total station configured to provide information regarding the position of the target relative to the location of the total station and align the total station with the estimated location of the target in accordance with the location and orientation of the total station and the estimated position of the target.

2. The total station system as set forth in claim 1, further comprising a second receiver configured to receive positioning signals from a positioning system and calculate at least an approximate location of the total station.

3. The total station system as set forth in claim 2, further comprising a third receiver configured to receive correction data from a base station, the correction data used to improve the calculation of the location of the total station.

4. The total station system as set forth in claim 3, further comprising a second receiver configured to receive correction data from a base station, said correction data configured to be used to improve the calculation of the estimated position of the target.

5. The total station system as set forth in claim 4, further comprising a first transmitter configured to transmit correction data to the target system, said target system using the correction data to improve the calculation of the estimated position of the target.

6. The total station system as set forth in claim 2, wherein the second receiver is a satellite receiver.

7. The total station system as set forth in claim 1, further comprising a servo system configured to move the total station in accordance with the estimated location of the target.

8. The total station system as set forth in claim 7, wherein said servo system is further configured to perform finer adjustments to more accurately align the total station with the target.

9. The total station system as set forth in claim 8, wherein the servo system is configured to scan a window about the estimated position of the target to more accurately align the measurement unit with the target.

10. The total station system as set forth in claim 7, wherein the servo system comprises control logic coupled to receive data representative of the location and orientation of the total station and the estimated position of the target, said control logic configured to control the servo system to align the total station with the estimated location of the target.

11. The total station system as set forth in claim 1, further comprising logic coupled to receive data representative of the location and orientation of the total station and the estimated position of the target and configured to generate control data to align to the total station with the estimated location of the target.

12. A method for providing accurate determination of the terrestrial position of a target based on position information provided by a positioning system, said method comprising the steps of:
   a total station system receiving position information regarding the target's estimated location from the target, said target receiving information from the positioning system; and
   aligning a total station of the total station system with the target based on the total station's location and orientation and the position information regarding the target's estimated location.

13. The method as set forth in claim 12, wherein the step of aligning comprises generating angular displacement data of the total station relative to a position and orientation of the total station.

14. The method as set forth in claim 13, further comprising the step of determining the location of the total station from positioning signals received from the positioning system.

15. The method as set forth in claim 14, further comprising the step of receiving correction data, said correction data used to improve the determination of the location of the total station.

16. The method as set forth in claim 15, wherein the correction data is further used to improve the determination of the location of the target.

17. The method as set forth in claim 12, wherein correction data is used to improve the determination of the location of the target.

18. The method as set forth in claim 17, further comprising the step of:
   transmitting correction data to the target, wherein the target uses the correction data to improve the determination of the location of the target.

19. The method as set forth in claim 17, further comprising the step of generating the correction data.

20. The method as set forth in claim 12, further comprising the step of performing fine adjustments such that the measurement unit more accurately points to the target.

21. The method as set forth in claim 20, wherein the step of performing fine adjustments comprises the steps of scanning a window about the estimated location of the target to determine the best position relative to the target.

22. The method as set forth in claim 21, wherein the best position is determined as the position at which a maximum received signal is returned by the target.

23. A surveying system for accurate determination of the terrestrial position of a target, based on position information provided by a positioning system, said surveying system comprising:
   a target comprising a first receiver configured to receive position information provided by the positioning system, and a transmitter configured to transmit position information regarding an estimated location of the target; and
   a total station system positioned at a determined location and orientation in a first reference system, said total station comprising;
      a second receiver that receives position information regarding the target's estimated location from the target,
      a total station configured to provide information of the location of the target relative to the location of the total station and align the total station with the estimated location of the target in accordance with the location and orientation of the total station and the position information regarding the estimated location of the target.

24. The system as set forth in claim 23, wherein the target further comprises a second receiver configured to receive correction information, the correction information being used to improve the estimation of the location of the target location.

25. The system as set forth in claim 23, wherein the total station system further comprises a third receiver configured to receive positioning information from the positioning system, said positioning system used to calculate at least an approximate location of the total station.

26. The system as set forth in claim 25, wherein the total station system further comprises a fourth receiver configured to receive correction information used to improve the calculation of the location of the total station.

27. The system as set forth in claim 22, wherein the total station comprises a servo system configured to move the total station in accordance with the estimated location of the target.

* * * * *